Jan. 25, 1955 R. F. RUBLE 2,700,425
ROTARY WING FOR AIRPLANES
Filed Sept. 12, 1950 2 Sheets-Sheet 1
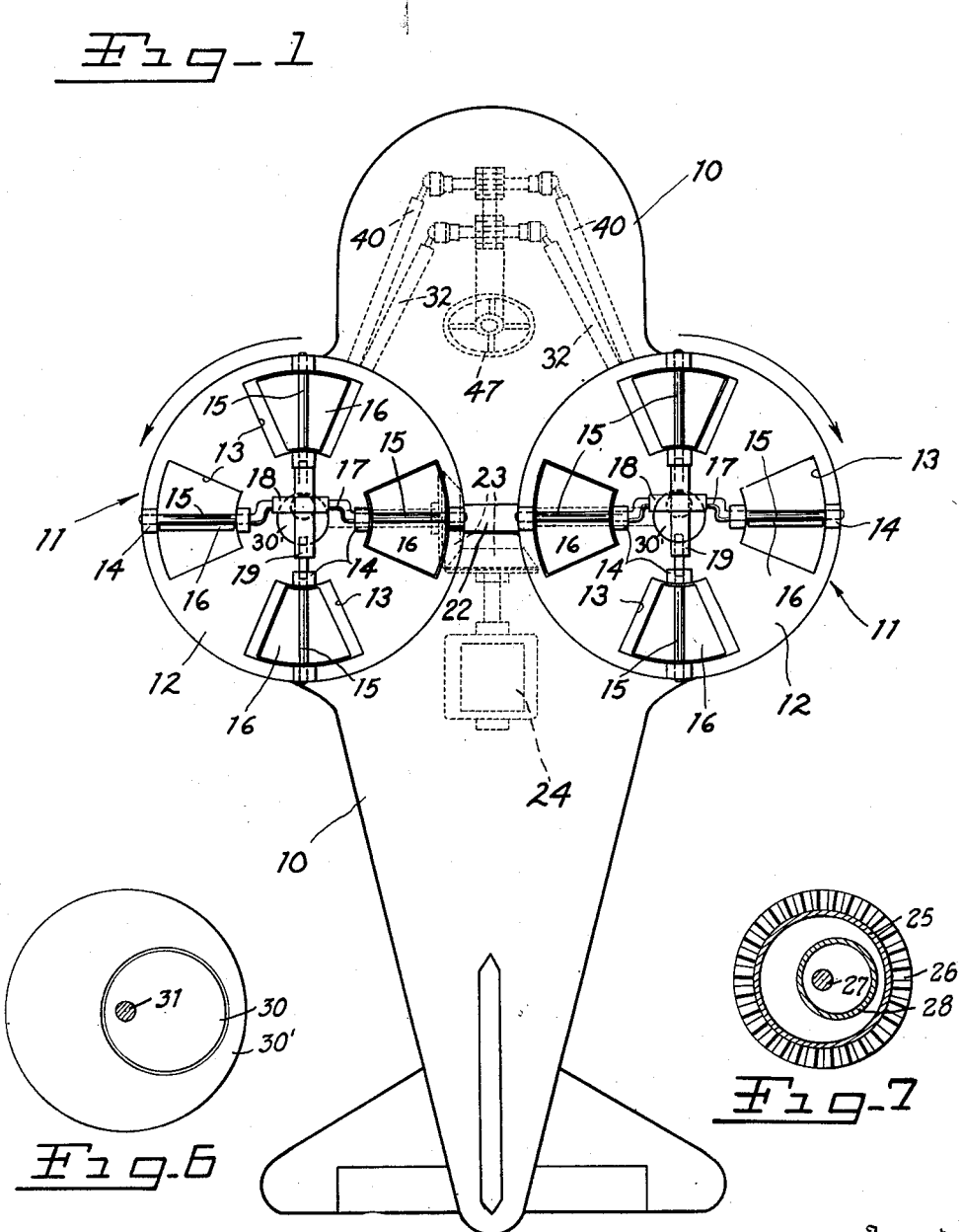
Inventor
ROMEY FRANKLIN. RUBLE
By Harvey & O'Connell
Attorneys

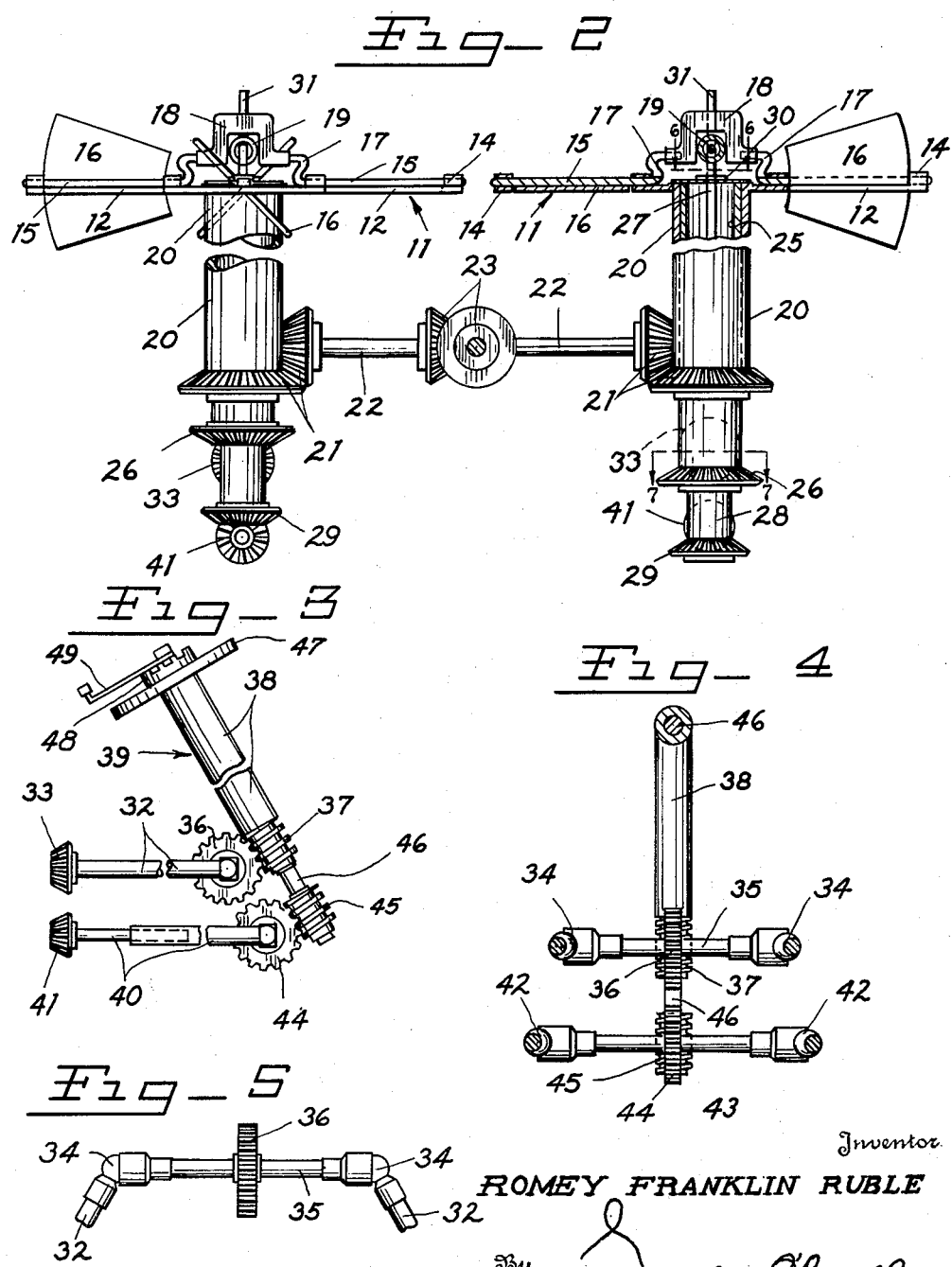

United States Patent Office 2,700,425
Patented Jan. 25, 1955

2,700,425

ROTARY WING FOR AIRPLANES

Romey Franklin Ruble, Monroeville, Ind., assignor of one-fourth to Arthur E. Voglewede, Fort Wayne, Ind.

Application September 12, 1950, Serial No. 184,442

3 Claims. (Cl. 170—160.25)

This invention relates to airplanes and more particularly to a rotary wing therefor, the principal object of the invention being to provide an airplane with an arrangement of rotary wings that will serve as wings or sustaining surfaces for the airplane, propulsion propellers for the airplane, and also as lifting propellers for the airplane, to the end that the airplane may take off and descend either vertically or at a desired angle, and also to the end that when in flight the airplane may be maneuvered with greater flexibility and ease than has heretofore been the case.

The combination rotary wing and propeller assembly of this invention embodies a simple, yet efficient combination and arrangement of relatively fixed or stationary and movable surfaces and control mechanism for the movable surfaces whereby the above stated object of the invention is obtained in a practical and efficient manner.

The invention, together with its objects and advantages, will be best understood when the following description thereof is read with reference to the accompanying drawing wherein is illustrated what is presently considered a preferred embodiment of the invention and in which:

Figure 1 is a top or plan view of an airplane provided with rotary wing and propeller assemblies embodying the features of this invention;

Figure 2 is an enlarged detail view of the rotary wing and propeller assemblies per se, with one of the assemblies being shown in elevation and the other being shown partly in section and partly in elevation;

Figure 3 is a detail side elevational view of the control post and operating connection between the post and the rotary wing and propeller assemblies;

Figure 4 is a vertical sectional view through the assembly of Figure 3 and showing the assembly substantially as viewed from the left of Figure 3;

Figure 5 is a fragmentary top plan view of one of the gear and shaft arrangements forming part of the connection between the control post and one of the rotary wing and propeller assemblies;

Figure 6 is a sectional view taken along the line 6—6 of Figure 2, looking in the direction of the arrows, and Figure 7 is a sectional view taken along the line 7—7 of Figure 2, looking in the direction of the arrows.

Referring now more particularly to the drawings, the reference numeral 10 designates the fuselage of an airplane, and which airplane and fuselage, in accordance with this invention, are characterized by the absence of the conventional driving propellers and sustaining surfaces or wings; the airplane and fuselage of this invention having in lieu of the aforementioned elements, combination wing and propeller assemblies 11—11.

As shown, the rotary wings and propeller assemblies are disposed one at each side of the fuselage 10.

Each rotary wing and propeller assembly 11 consists, essentially, of a large disc-like element 12 of suitable light material. The member 12 is provided with a series of substantially segmental-shaped openings 13 arranged in a circular series, there being preferably four of such openings. The solid or imperforate portions of the element 12 thus provide relative stationary sustaining surfaces or wing portions. As shown, the element or member 12 is provided with bearings 14, there being one pair of bearings for each opening 13. Each pair of bearings 14 supports, for oscillatory movement, a rod or shaft 15. Each rod or shaft 15 has fixed thereon, so as to be movable therewith, a vane or blade 16 constituting a movable surface portion of the element 12.

Each shaft 15 is provided at one end with a crank arm 17. The shafts 15 are arranged in pairs, with the shaft of each pair being in alignment and coplanar with, and at right angles to the axes of the other pair of shafts. The shafts of each pair are connected by a tubular member, the tubular member connecting the shaft of one pair being indicated by the reference numeral 18, and the tubular member connecting the shafts of the other pair being indicated by the reference numeral 19. In this connection it will be noted that the crank arms of the shafts are slidably accommodated within the respective opposite ends of the tubular member connecting that pair of shafts; and that also one of the tubular connecting members, in the present instance tubular connecting member 18, has an intermediate portion thereof offset in a manner to accommodate, as by straddling, the other tubular connecting member, in the present instance, tubular connecting member 19 (see Figure 2).

The disc-like element 12 of each of the rotary wing and propeller assemblies 11 is mounted on the upper end of a vertical shaft 20. The shafts 20 of these two assemblies project into the fuselage 10 where they are supported for rotary movement in any suitable manner. The shafts 20 are driven, through the medium of bevel gearing 21, shaft 22 and bevel gearing 23, from any suitable engine or prime mover 24 conveniently mounted and located in the fuselage 10 (see Figure 1). Thus it will be seen that the engine or prime mover 24 drives the propeller assemblies for rotating the disc-like element 12 thereof in the direction indicated by the arrows in Figure 1.

The shafts 20 of the assemblies 11 have rotatably disposed therein shafts 25 which at their lower ends extend beyond the shafts 20 and are equipped with bevel gears 26 forming part of the mechanism for rotating the shafts 25, and which mechanism is hereinafter described more in detail.

Eccentric shafts 27 extend longitudinally through the shafts 25 and are rotatable relative to the shafts 25. At their lower ends shafts 27 extend beyond the shafts 25 and have secured thereto hubs 28 of bevel gears 29 which latter form part of a control or operating mechanism above referred to, and as before stated, hereinafter described in detail.

On the upper ends thereof shafts 20 are provided with disc-like heads 30 rotatable in response to rotation of hub 28 and mounted in eccentric openings of caps 30' which in turn are rotatable with shaft 25. Through heads 30 extend upwardly eccentric pins 31. The pin 31 of shafts 27 of each assembly 11 extends upwardly through openings provided in the tubular connecting members 18 and 19 for imparting a rocking movement to said members upon rotative adjustment of shafts 25 and 27 for varying the angles of incidence of the oscillatory vanes or surfaces 16 and control oscillatory movement of said vanes or surfaces, according to the conditions under which the airplane is being operated and as will be hereinafter made more manifest.

Hubs 28 are positioned eccentrically of shafts 25 and have secured eccentrically thereof, shafts 27 which, in turn, are eccentrically fixed to discs 30. Shafts 27 move in an arc upon rotation of hubs 28 and flex slightly under certain operating conditions. Pins 31 are connected to shafts 27 and move in an arc upon rotation of hubs 28 to effect movement of the tubular connecting members 18 and 19, thereby producing either vertical ascent and descent or horizontal flight. The former is effected by rotating shafts 27 until pins 31 assume a position in axial alignment with shafts 20 which sets all the vanes 16 at the same angle of incidence. Horizontal flight is effected by rotating pins 31 one-half turn from their position of vertical ascent and descent, thereby varying the angle of incidence of the vanes 16 with respect to discs 12. The direction of flight is the direction in which pins 31 are turned.

The purpose of inner shafts 25 is for directional control so that the airplane may be moved fore, aft or sidewise. To effect this, inner shafts 25 are rotated, thereby moving eccentric discs 30 in an arc until they are so located that a half turn of pins 31 produces horizontal flight in the direction in which the pins are turned. If the rotary wing is set for directional flight, reverse movement to the direction of travel is imparted thereto by turning inner shafts 25 and shafts 27 a half turn. To effect vertical ascent or descent from the horizontal flight settings, shafts 25 are immobilized and shafts 27 given half a turn which shifts eccentric pins 31 to the center position of shafts 20.

For selectively and simultaneously rotating the shafts 25 and 27 to operate and set the movable surfaces or vanes 16, suitable means under the control of the operator is employed. As shown to advantage in Figures 3 to 5, inclusive, such means comprise shafts 32 provided at one end with bevel gears 33 meshing with the aforementioned gears 26. Shafts 32 have universal connections 34 with a transverse shaft 35 provided with a gear 36 that is in mesh with a worm 37 on an outer control rod 38 forming part of a control post assembly indicated generally by the reference numeral 39. Shafts 40 are provided at one end with bevel gears 41 that are in mesh with the bevel gears 29 connected with the shafts 27. Shafts 40 have universal connections 42 with a shaft 43 that is provided with a gear 44 in mesh with a worm 45 carried by the inner rod 46 of the aforementioned control post assembly 49.

The rod 38 of control post assembly 39 is provided with a hand wheel 47 having a hub notched or otherwise equipped to provide a rack 48. Rod 46 of control post assembly 39 is provided with a manipulating handle or crank arm 49 that is mounted thereon in a manner not to rotate relative thereto but to shift axially thereof so as to move into and out of engagement with the rack 48 for engaging and disengaging the rods 46 and 38, depending upon whether it is desired to rotate either of the rods independently of one another or to rotate the rods simultaneously.

In connection with the foregoing description of the mechanism for rotating the shafts 25 and 27 to thereby operate and set the vanes 16, it will be noted that the gears 26 and 29 of one of the assemblies 11 face upwardly and the corresponding gears 26, 29 of the other assemblies 11 face downwardly (Figure 2), and this is for the purpose of permitting driving rotation of the assemblies in the direction indicated by the arrows in Figure 1, and also the operating and setting of the vanes or control surfaces 16 of each assembly so that the desired functional cooperation is always obtained.

The manner of raising and lowering the airplane, and for driving the airplane in flight may be briefly described as follows. In starting, the motor 24 is set in operation for rotating the assemblies 11. If a direct vertical lift is desired, the operator manipulates the crank or hand lever 49 to release shaft 46 and then to rotate the shaft 46 relative to the shaft 38 of the control post assembly 39. This action will result in a turning of the shafts 27 and consequent oscillation of the vanes 16 to set all of the vanes 16 of the assemblies at the same pitch. The result is that the assemblies 11 lift the airplane vertically from the earth into the air. Upon reaching the height desired, the operator, by rotating the hand wheel 47 causes, through the aforementioned driving connections between rod 38 and shafts 25 a rotation of the mentioned shafts the desired degree with the result that shafts 27 also move in the arc of a circle with the shafts 25, and this movement of shafts 27, cause, through the medium of the aforementioned eccentric pin connections with the vanes or blades 16 a rocking movement of these blades or vanes so that the vanes of each assembly are disposed at a different pitch with respect to each other and at angles of incidence for supplying traction for forward or lateral flight, and still contribute to the sustaining of the plane in flight.

It will also be apparent that with crank 49 engaged with rack 48 a turning of the hand wheel 47 will result in simultaneous rotation of the shafts 25 and the shafts 27 for varying the angles of incidence of the vanes 16 as may be found desirable in accordance with the conditions under which the airplane is being operated.

From the foregoing it will be seen that the assemblies 11 of this invention serve not only as wings or sustaining planes for the airplane but also as elevators and ailerons, and more particularly as lifting and traction propellers for the airplane, giving to the airplane maximum maneuverability and stability and at the same time having the advantage of vertical ascent and descent.

While the invention has been described in detail in its presently preferred embodiment, it will, of course, be understood that such has been done for purposes of illustration only and not by way of limitation, and therefore only such limitations are to be imposed thereon as may reasonably come within the scope of the appended claims.

What I claim is:

1. A rotary wing and propeller comprising, a driven shaft, a disc-like element mounted on the shaft to rotate therewith and provided with openings, vanes mounted on shafts, pivoted about radial axes in said openings, crossed tubular members in sleeved connection with the vane shafts and connected thereto at points offset from the axes of rotation of said vane shafts, said tubular members joining the vanes in pairs, and eccentric means connected with the tubular members for operating the vanes.

2. A rotary wing and propeller comprising, a driven shaft, means for driving the latter, a disc-like element on the shaft to rotate therewith and provided with openings, oscillatory vanes mounted across said openings, a shaft rotatably accommodated within and axially of the driven shaft, an eccentric shaft extending longitudinally of the second mentioned shaft and movable with respect thereto, means connecting the vanes with the eccentric shaft for transmitting movement of the second mentioned shaft and the eccentric shaft to the vanes for setting the vanes at the same pitch and for varying the angle of incidence of the vanes with respect to one another, and means connected with the second mentioned shaft and the eccentric shaft for selectively rotating them about their respective axes independently or simultaneously.

3. A rotary wing and propeller comprising, a driven shaft, a disc-like element on the driven shaft to rotate therewith and provided with openings, oscillatory shafts bridging the openings, vanes upon said shafts, a pair of control shafts extending through the driven shaft, one of said control shafts being coaxial with the driven shaft and the other of the control shafts having its axis eccentrically disposed relative to the axes of the driven and first mentioned control shafts, tubular members in sleeved connection with the oscillatory shafts connecting the latter in pairs, and an eccentric connection between the eccentrically disposed control shaft and the tubular members for oscillating the oscillatory shafts incidental to rotative movement being imparted to either or both of the control shafts.

References Cited in the file of this patent

UNITED STATES PATENTS

| Number | Name | Date |
|---|---|---|
| 11,031 | Champion | June 6, 1854 |
| 281,915 | Nelsson | July 24, 1883 |
| 410,148 | Carpenter | Sept. 3, 1889 |
| 1,052,378 | Porter | Feb. 4, 1913 |
| 1,636,320 | Montero | July 19, 1927 |
| 2,086,803 | Hays | July 13, 1937 |
| 2,496,385 | Drapier | Feb. 7, 1950 |

FOREIGN PATENTS

| Number | Country | Date |
|---|---|---|
| 110,201 | Great Britain | Oct. 16, 1917 |